(12) United States Patent
Abe

(10) Patent No.: US 7,634,346 B2
(45) Date of Patent: Dec. 15, 2009

(54) RUNNING CONTROL DEVICE FOR VEHICLE

(75) Inventor: Kyoichi Abe, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 75 days.

(21) Appl. No.: 11/814,971

(22) PCT Filed: Mar. 23, 2006

(86) PCT No.: PCT/JP2006/306592
§ 371 (c)(1),
(2), (4) Date: Jul. 27, 2007

(87) PCT Pub. No.: WO2006/101261
PCT Pub. Date: Sep. 28, 2006

(65) Prior Publication Data
US 2009/0018744 A1   Jan. 15, 2009

(30) Foreign Application Priority Data
Mar. 23, 2005   (JP)   ............... 2005-084441

(51) Int. Cl.
*B60T 8/32* (2006.01)
*B60T 7/12* (2006.01)
(52) U.S. Cl. .................. 701/96; 701/93; 701/70
(58) Field of Classification Search ............... 701/70, 701/72, 79, 91, 93, 96
See application file for complete search history.

(56) References Cited

U.S. PATENT DOCUMENTS 5,969,640 A   10/1999   Timm et al.
5,978,724 A   11/1999   Sekine
6,298,296 B1 *  10/2001   Takahashi ................. 701/70
2002/0032514 A1   3/2002   Kuroda et al.

FOREIGN PATENT DOCUMENTS

| DE | 195 02 954 A1 | 8/1995 |
|----|---|---|
| DE | 199 07 633 A1 | 10/1999 |
| JP | 63 151528 | 6/1988 |
| JP | 8 290728 | 11/1996 |
| JP | 10 149499 | 6/1998 |
| JP | 2001 52300 | 2/2001 |
| JP | 2002-29285 | 1/2002 |
| JP | 2002 166747 | 6/2002 |
| JP | 2003 200751 | 7/2003 |
| JP | 2005 28995 | 2/2005 |

OTHER PUBLICATIONS

JP 2005-028995 Translation.*

* cited by examiner

*Primary Examiner*—Thomas G Black
*Assistant Examiner*—Ce Li
(74) *Attorney, Agent, or Firm*—Oblon, Spivak, McClelland, Maier & Neustadt, L.L.P.

(57) ABSTRACT

A curve-travel target acceleration calculator calculates a curve-travel target acceleration. A first curve-travel target acceleration calculator calculates a first target acceleration corresponding to a gentle curve, and a second curve-travel target acceleration calculator calculates a second target acceleration corresponding to a sharp curve. The curve-travel target acceleration is set to the smaller of the first target acceleration and the second target acceleration. A follow-up target acceleration calculator calculates a follow-up target acceleration and a constant-speed target acceleration calculator calculates a constant-speed target acceleration. An arbitrator selects as a target acceleration the minimum out of the curve-travel target acceleration, the constant-speed target acceleration, and the follow-up target acceleration.

2 Claims, 6 Drawing Sheets

Fig.6
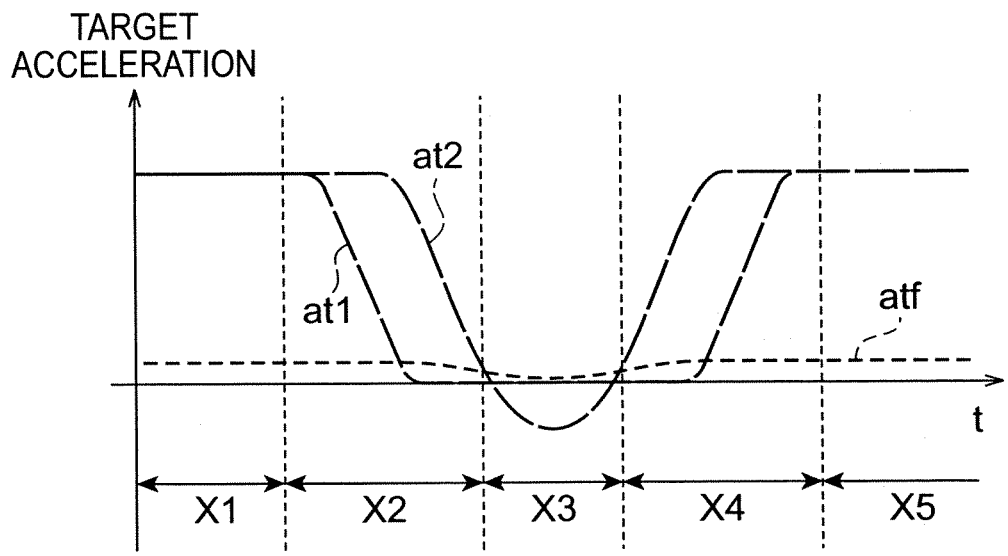
(a)
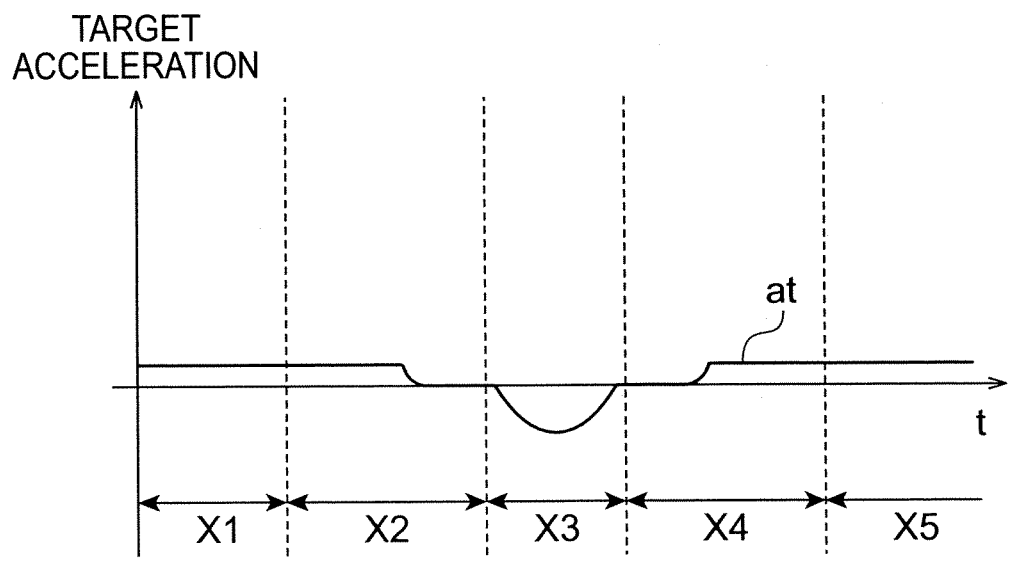
(b)

RUNNING CONTROL DEVICE FOR VEHICLE

TECHNICAL FIELD

The present invention relates to vehicle cruise control apparatus and, more particularly, to a vehicle cruise control apparatus for controlling a host vehicle to travel to follow a preceding vehicle.

BACKGROUND ART

In recent years, the vehicle cruise control apparatus for controlling the host vehicle to travel to follow a preceding vehicle traveling ahead has been developed in order to reduce the manipulation load on the driver driving the vehicle. This cruise control apparatus is arranged to control the acceleration of the host vehicle, for example, so that the inter-vehicular distance between the preceding vehicle detected by a sensor such as a camera or a radar, and the host vehicle becomes a target inter-vehicular distance.

An example of such cruise control apparatus is the automatic follow-up control apparatus disclosed in Japanese Patent Application Laid-Open No. 2003-200751. This automatic follow-up control apparatus is arranged to detect an angle of the preceding vehicle relative to the position of the host vehicle and an inclination of the preceding vehicle made by a direction of the host vehicle and a direction of the preceding vehicle on the occasion of performing the follow-up control, and to estimate a radius of a curve that the host vehicle is about to enter, from the detected angle and inclination. An acceleration of the host vehicle is determined according to the radius of the curve.

DISCLOSURE OF THE INVENTION

The cruise control apparatus disclosed in the above-mentioned Patent Document 1 is arranged to calculate the acceleration of the host vehicle by addition of an acceleration for the follow-up control and an acceleration for safe travel on the curve. For this reason, for example, when the preceding vehicle accelerates in the middle of the curve, the acceleration is calculated to follow the acceleration of the preceding vehicle, which posed the problem that adequate deceleration was not implemented for the host vehicle.

An object of the present invention is therefore to provide a vehicle cruise control apparatus capable of implementing safe travel of a host vehicle on curves, irrespective of accelerating and decelerating states of a preceding vehicle, on the occasion of performing cruise control while following the preceding vehicle.

A vehicle cruise control apparatus according to the present invention, achieving the above object, is a vehicle cruise control apparatus comprising relative relation calculating means for calculating a relative relation between a target object detected by object detecting means, and a host vehicle; specification setting means for setting a target relative relation being a relative relation as a target, and for setting a first curve tolerance defining an allowable curve state; first calculating means for calculating a first speed control amount on the basis of the relative relation and the target relative relation; second calculating means for calculating a second speed control amount on the basis of the first curve tolerance; and controlling means for controlling a braking/driving force of the vehicle on the basis of a minimum out of the first speed control amount and the second speed control amount.

The vehicle cruise control apparatus according to the present invention comprises the first calculating means for calculating the first speed control amount on the basis of the target relative relation and the relative relation, and the second calculating means for calculating the second speed control amount on the basis of the first curve tolerance defining the allowable curve state, and the braking/driving force of the vehicle is controlled based on the minimum out of the speed control amounts calculated by these calculating means. For this reason, the control is effected so as to achieve a safe vehicle speed in various situations, for example, including a case where the inter-vehicular distance becomes short during travel at a speed at which the vehicle can safely travel on a curve, a case where the inter-vehicular distance is large during travel on a curve, and a case where the vehicle goes into a curve while catching up with a preceding vehicle. Therefore, the host vehicle is able to safely travel on a curve, irrespective of accelerating and decelerating states of the preceding vehicle.

The "speed control amounts" stated in the present invention embrace speed control amounts to directly control the speed of the vehicle, and amounts capable of controlling the speed of the vehicle as a result of control, such as acceleration control amounts and driving force control amounts. The "target relative relation" in the present invention refers to a target of a relative relation between the target object and the host vehicle and, for example, when the target object is a preceding vehicle, specific examples of the target relative relation are a target inter-vehicular distance, a target inter-vehicular time, a target relative speed, and so on. Furthermore, the "curve state" in the present invention can be expressed, for example, by a curve radius (radius of curvature), a curvature of a curve, or the like.

It is also possible to adopt a configuration wherein the specification setting means further sets a second curve tolerance defining a gentler allowable curve state than the first curve tolerance; the vehicle cruise control apparatus further comprises third speed calculating means for calculating a second speed control amount on the basis of the second curve tolerance and for, when the third speed control amount is smaller than a lower limit defining a minimum of the third speed control amount, calculating the third speed control amount as being the lower limit; the controlling means controls the braking/driving force of the vehicle on the basis of a minimum out of the first speed control amount, the second speed control amount, and the third speed control amount.

In a case where there is only one curve tolerance, if the curve tolerance is set in accordance with gentle curves, the deceleration will be too large; if the curve tolerance is set in accordance with sharp curves to the contrary, the deceleration will be too small on gentle curves. It is also conceivable to adopt a configuration of simply setting the first curve tolerance for sharp curves and the second curve tolerance for gentle curves, calculating the second speed control amount on the basis of the first curve tolerance, and calculating the third speed control amount on the basis of the second curve tolerance. In this case, however, the third speed control amount will always become smaller between the second speed control amount and the third speed control amount, and the third speed control amount will never be selected, which fails to solve the problem in the case where there is only one curve tolerance. Therefore, the cruise control apparatus according to the present invention is arranged to set the lower limit for the third speed control amount and to set this lower limit as the third speed control amount when the third speed control amount becomes smaller than the lower limit. Therefore, the second speed control amount is adopted when the second speed control amount is smaller than the lower limit of the third speed control amount, and this achieves utilization of the second speed control amount and the third speed control amount and thus well solves the problem in the case where there is only one curve tolerance.

It is also possible to adopt a configuration wherein the lower limit is 0.

When the lower limit of the third speed control amount is set to 0 in this manner, the host vehicle travels without acceleration during travel on a gentle curve. Therefore, the deceleration can be securely implemented in necessary situations.

The scope of further application of the present invention will become apparent from the following detailed description of the invention. It is, however, noted that the detailed description and specific examples, while illustrating the preferred embodiments of the present invention, are presented by way of illustration only and it is apparent that various modifications and improvements within the spirit and scope of the present invention are obvious to those skilled in the art in view of the detailed description.

BRIEF DESCRIPTION OF THE DRAWINGS

FIG. 6 includes (a) a graph showing temporal changes of follow-up target acceleration, first target acceleration, and second target acceleration, and (b) a graph showing a temporal change of target acceleration.

BEST MODE FOR CARRYING OUT THE INVENTION

Figure 1:
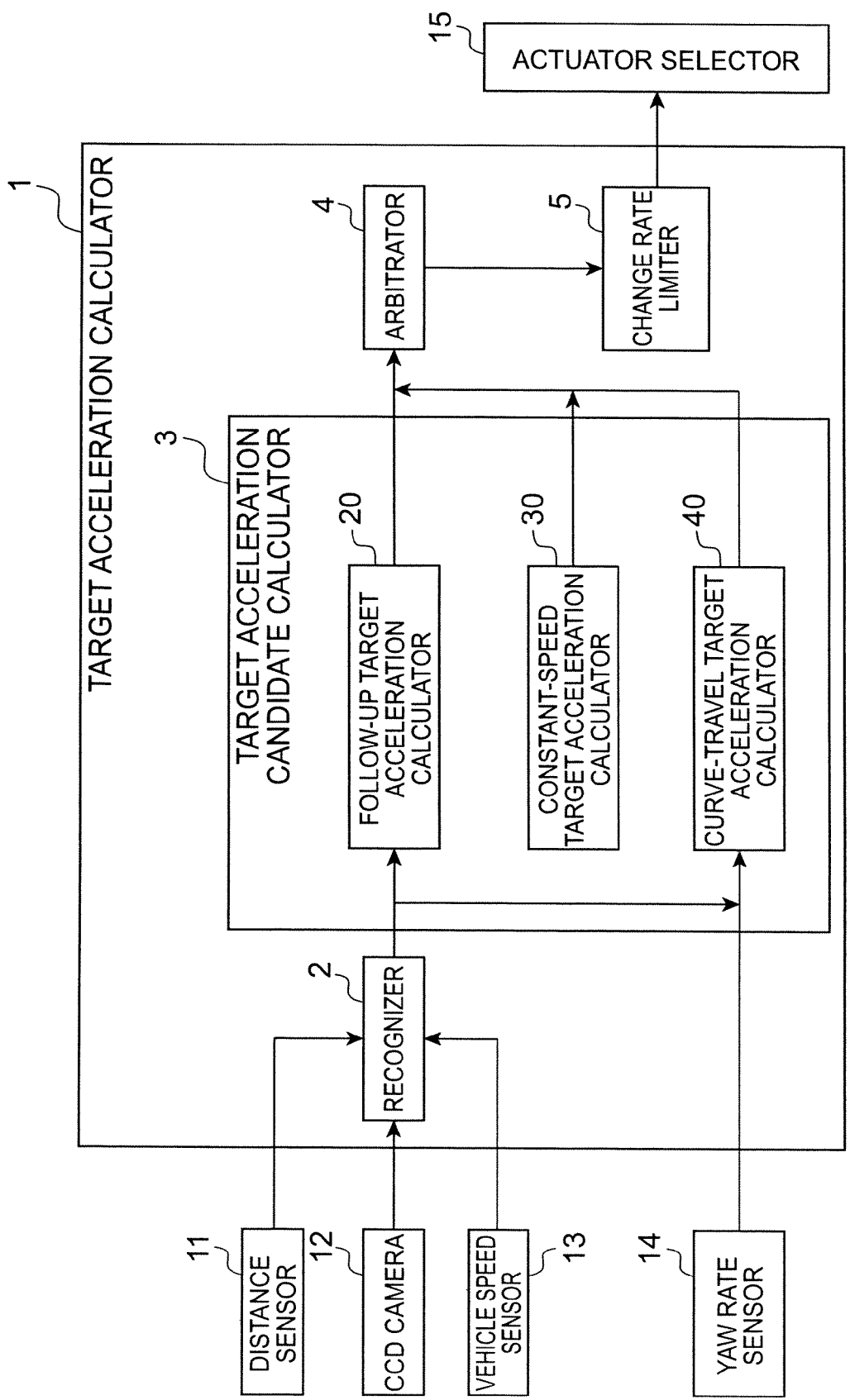
FIG. 1 is a bock configuration diagram of a vehicle cruise control apparatus according to the present invention.

A preferred embodiment of the present invention will be described below with reference to the drawings. FIG. 1 is a block configuration diagram of a vehicle cruise control apparatus according to the present invention, and FIG. 2 a block configuration diagram of a curve-travel target acceleration calculator.

Figure 2:
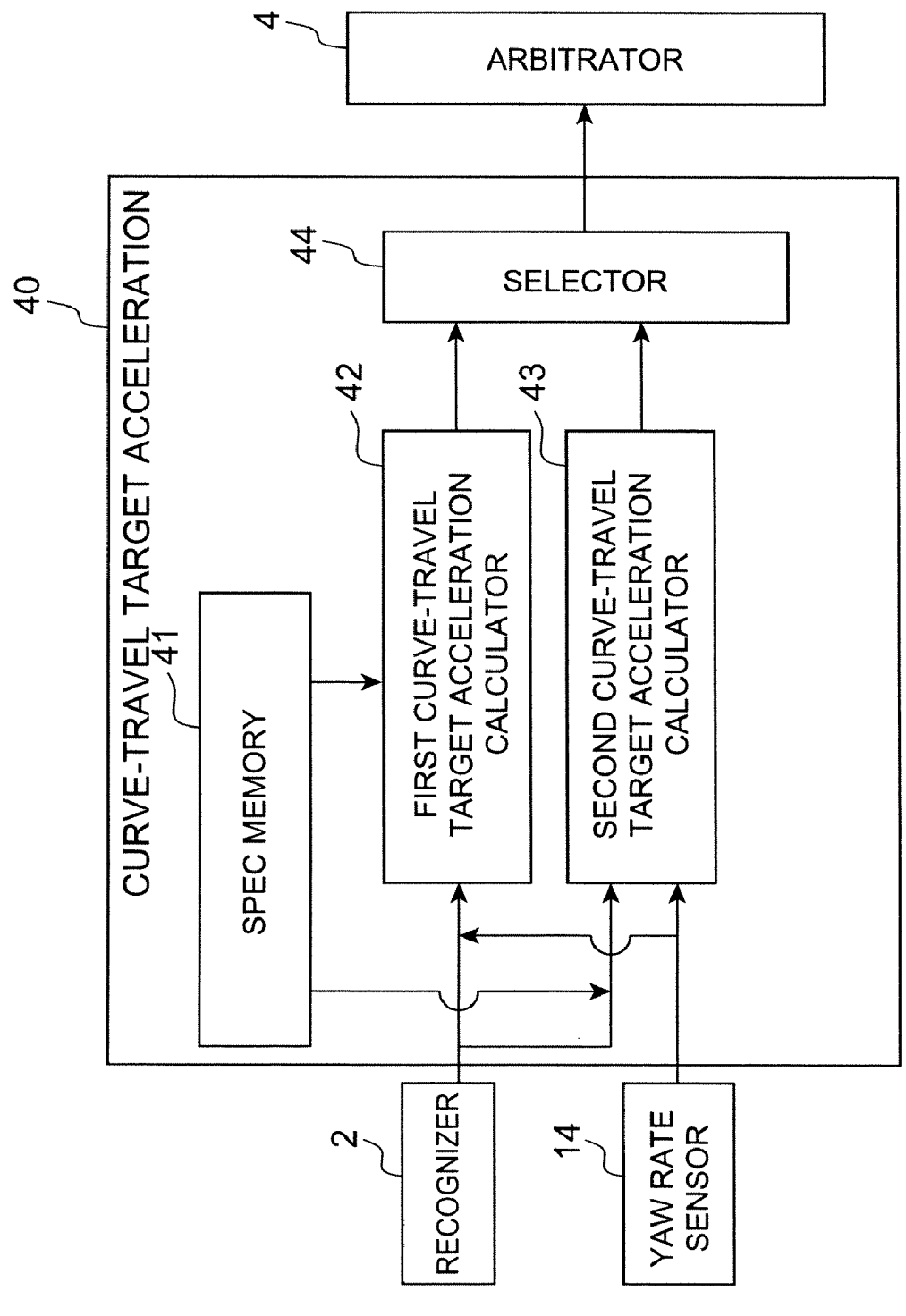
FIG. 2 is a block configuration diagram of a curve-travel target acceleration calculator.

As shown in FIG. 1, the vehicle cruise control apparatus according to the present embodiment is equipped with a target acceleration calculator 1. The target acceleration calculator 1 is provided with a recognizer 2, a target acceleration candidate calculator 3, an arbitrator 4, and a change rate limiter 5. The following elements are connected to the target acceleration calculator 1: a distance sensor 11, a CCD camera 12, a vehicle speed sensor 13, a yaw rate sensor 14 as curve state detecting means of the present invention, and an actuator selector 15 as controlling means of the present invention. Furthermore, the target acceleration candidate calculator 3 is provided with a follow-up target acceleration calculator 20 as relative relation calculating means and first calculating means of the present invention, a constant-speed target acceleration calculator 30, and a curve-travel target acceleration calculator 40 as specification setting means. The curve-travel target acceleration calculator 40 is provided, as shown in FIG. 2, with a specification memory 41, a first curve-travel target acceleration calculator 42 as third calculating means of the present invention, a second curve-travel target acceleration calculator 43 as second calculating means of the present invention, and a selector 44.

The distance sensor 11 is comprised, for example, of a millimeter-wave radar sensor mounted at the front end of the host vehicle and detects a distance to a preceding vehicle as a target object of the present invention located in front of the host vehicle. The distance sensor 11 transmits the detected distance between the preceding vehicle and the host vehicle to the recognizer 2 in the target acceleration calculator 1. The CCD camera 12 is located, for example, in the vicinity of the windshield of the host vehicle and takes an image in front of the host vehicle. The CCD camera 12 transmits the taken image to the recognizer 2 in the target acceleration calculator 1. The vehicle speed sensor 13 is mounted, for example, in the body of the host vehicle and detects the vehicle speed of the host vehicle. The vehicle speed sensor 13 transmits the detected vehicle speed to the recognizer 2. Furthermore, the yaw rate sensor 14 is mounted, for example, in the body of the host vehicle and detects the yaw rate in the host vehicle. The yaw rate sensor 14 transmits the detected yaw rate to the curve-travel target acceleration calculator 40.

The recognizer 2 performs image processing of the image transmitted from the CCD camera 12, to recognize white lines drawn on a road, and obstacles on the road. The recognizer 2 calculates a relative distance, a relative speed, and a relative acceleration to the preceding vehicle, based on the distance information transmitted from the distance sensor 11. The recognizer 2 transmits the calculated relative distance, relative speed, and relative acceleration to the preceding vehicle to the follow-up target acceleration calculator 20 and to the curve-travel target acceleration calculator 40 in the target acceleration candidate calculator 3. Furthermore, the recognizer 2 transmits the transmitted vehicle speed from the vehicle speed sensor 13 to the follow-up target acceleration calculator 20 and to the curve-travel target acceleration calculator 40.

The follow-up target acceleration calculator 20 stores a target inter-vehicular time ht used in calculation of a target inter-vehicular distance, and uses this target inter-vehicular time ht and the vehicle speed of the host vehicle transmitted from the recognizer 2, to calculate the target inter-vehicular distance AL, based on Eq (1) below.

$$AL = ht*V \tag{1}$$

The follow-up target acceleration calculator 20 stores control gains K1, K2 for calculation of a target acceleration, and uses the calculated target inter-vehicular distance AL, the inter-vehicular distance L and relative speed VR to the preceding vehicle transmitted from the recognizer 2, and the stored control gains K1, K2 to calculate a follow-up target acceleration atf, based on Eq (2) below. The follow-up target acceleration calculator 20 transmits the calculated follow-up target acceleration atf to the arbitrator 4.

$$atf = K1(L-AL) + K2*VR \tag{2}$$

The constant-speed target acceleration calculator 30 calculates a constant-speed target acceleration atu being a target acceleration for travel at a set vehicle speed, and transmits the calculated constant-speed target acceleration atu to the arbitrator 4.

The specification memory 41 in the curve-travel target acceleration calculator 40 preliminarily stores a predetermined control gain K, a gentle-curve allowable lateral acceleration G1 as an allowable lateral acceleration for a gentle curve with a large curve radius as a curve state, and a sharp-curve allowable lateral acceleration G2 as an allowable lateral acceleration for a sharp curve with a small curve radius. The specification memory 41 constitutes the specification storing means of the present invention. A curve tolerance is a value defined by a lateral acceleration in the present embodiment; the gentle-curve allowable lateral acceleration G1 corresponds to the second curve tolerance of the present invention, and the sharp-curve allowable lateral acceleration G2 to the first curve tolerance of the present invention.

The control gain K herein can be set to a predetermined value for use in calculation of the target acceleration from a deviation between a target speed and an actual speed of the host vehicle. The allowable lateral accelerations herein are preliminarily set as a plurality of lateral accelerations in accordance with levels of sharpness felt by the driver during travel on curves. Specifically, for example, 0.15 G is set as the gentle-curve allowable lateral acceleration G1, and 0.3 G as the sharp-curve allowable lateral acceleration G2. Furthermore, since the lateral acceleration 0.3 G as a curve tolerance allows up to a sharper curve state than the lateral acceleration 0.15 G as a curve tolerance, a curve tolerance defined by a larger value of lateral acceleration allows up to a sharper curve. Conversely, since the lateral acceleration 0.15 G as a curve tolerance allows merely up to a gentler curve state than the lateral acceleration 0.3 G as a curve tolerance, a curve tolerance defined by a smaller value of lateral acceleration allows merely up to a gentler curve state. The specification memory 41 transmits the target speed Av and gentle-curve allowable lateral acceleration G1 to the first curve-travel target acceleration calculator 42, and transmits the target speed Av and sharp-curve allowable lateral acceleration G2 to the second curve-travel target acceleration calculator 43.

The first curve-travel target acceleration calculator 42 calculates a curve radius R, based on the yaw rate transmitted from the yaw rate sensor 14. The first curve-travel target acceleration calculator 42 uses the calculated curve radius R and the gentle-curve allowable lateral acceleration G1 transmitted from the specification memory 41, to calculate a first target speed Av1, using Eq (3) below.

$$Av1 = \text{sqrt}(R*G1) \quad (3)$$

The first curve-travel target acceleration calculator 42 uses the calculated first target speed Av1 and the vehicle speed v of the host vehicle transmitted from the recognizer 2, to calculate a first target acceleration at1, based on Eq (4) below. Furthermore, the first curve-travel target acceleration calculator 42 sets, for example, 0 G as a lower limit for the first target acceleration at1. Therefore, the first curve-travel target acceleration calculator 42 compares the calculated first target acceleration at1 with 0 G as the lower limit and, when the first target acceleration at1 is smaller than 0 G, it adopts the lower limit of 0 G as the first target acceleration at1. In this manner, the first curve-travel target acceleration calculator 42 transmits the calculated first target acceleration at1 (or the lower limit of 0 G when the calculated first target acceleration at1 is smaller than the lower limit) to the selector 44.

$$at1 = K*(Av1-v) \quad (4)$$

The second curve-travel target acceleration calculator 43 uses the curve radius R and the sharp-curve allowable lateral acceleration G2 transmitted from the specification memory 41, to calculate a second target speed Av2, using Eq (5) below.

$$Av2 = \text{sqrt}(R*G2) \quad (5)$$

The second curve-travel target acceleration calculator 43 uses the calculated second target speed Av2 and the vehicle speed v of the host vehicle transmitted from the recognizer 2, to calculate a second target acceleration at2, based on Eq (6) below. Furthermore, the second curve-travel target acceleration calculator 43 sets, for example, −0.3 G as a lower limit for the second target acceleration at2. Therefore, the second curve-travel target acceleration calculator 43 compares the calculated second target acceleration at2 with the lower limit of −0.3 G and, when the second target acceleration at2 is smaller than −0.3 G it adopts the lower limit of −0.3 G as the second target acceleration at2. In this manner, the second curve-travel target acceleration calculator 43 transmits the calculated second target acceleration at2 (or the lower limit of −0.3 G when the calculated second target acceleration at2 is smaller than the lower limit) to the selector 44.

$$at2 = K*(Av2-v) \quad (6)$$

The selector 44 compares the first target acceleration at1 transmitted from the first curve-travel target acceleration calculator 42, with the second target acceleration at2 transmitted from the second curve-travel target acceleration calculator 43. Then it selects the smaller out of the first target acceleration at1 and the second target acceleration at2, as a curve-travel target acceleration atc and transmits it to the arbitrator 4.

The arbitrator 4 performs an arbitration among the three target accelerations atf, atu, atc transmitted from the follow-up target acceleration calculator 20, the constant-speed target acceleration calculator 30, and the curve-travel target acceleration calculator 40 and determines the smallest target acceleration as a target acceleration at. Then the arbitrator 4 transmits the target acceleration determined in this manner, to the change rate limiter 5.

The change rate limiter 5 stores a predetermined limit value for change rates of acceleration of the host vehicle. The change rate limiter 5 compares the target acceleration transmitted from the arbitrator 4, with the stored limit value and, when the change rate of acceleration does not exceed the limit value, it adopts the target acceleration transmitted from the arbitrator 4, as the target acceleration as it is. When the target acceleration transmitted from the arbitrator 4 exceeds the limit value, the change rate limiter 5 adopts the limit value as the target acceleration.

The change rate limiter 5 transmits the adopted target acceleration to the actuator selector 15. The actuator selector 15 is connected to an unrepresented engine controller and to an unrepresented brake controller; when the adopted target acceleration is positive, it transmits the target acceleration to the engine controller; when the adopted target acceleration is negative, it transmits the target acceleration to the brake controller. The engine controller and the brake controller control the engine and the brake, respectively, so as to achieve the transmitted target acceleration.

Figure 3:
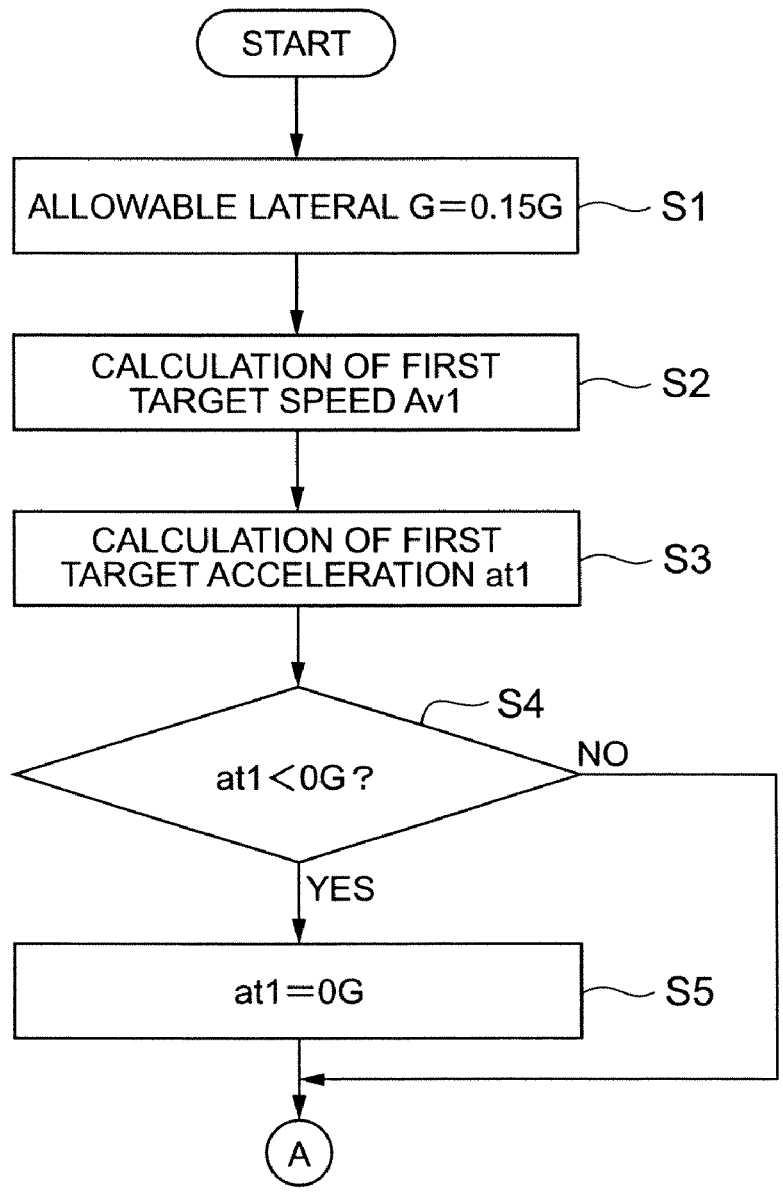
FIG. 3 is a flowchart showing a procedure of cruise control.

The following will describe a procedure of the cruise control by the cruise control apparatus according to the present embodiment. FIG. 3 is a flowchart showing the procedure of the cruise control according to the present embodiment, and FIG. 4 a flowchart subsequent to FIG. 3. The below will describe the procedure of control in the curve-travel target acceleration calculator 40 which is a characteristic part of the present embodiment.

As shown in FIG. 3, for calculation of the curve-travel target acceleration atc, the cruise control according to the present embodiment involves the first step in which the first curve-travel target acceleration calculator 42 sets the allowable lateral acceleration to the gentle-curve allowable lateral acceleration G1 (S1). This gentle-curve allowable lateral acceleration G1 is set to 0.15 G Next, the first target speed Av1 is calculated based on the aforementioned Eq (3), in order to determine a vehicle speed for achievement of this gentle-curve allowable lateral acceleration G1 as the first target speed Av1 (S2). Furthermore, the first target acceleration at1 is calculated based on the aforementioned Eq (4), in order to determine an acceleration for achievement of this first target speed Av1 (S3).

After the first target acceleration at1 is calculated in this manner, it is determined whether the first target acceleration at1 is less than 0 (S4). When it is determined that the first target acceleration at1 is less than 0, the first target acceleration at1 is set to 0; when the first target acceleration at1 is not less than 0, the calculated first target acceleration at1 is adopted as the first target acceleration at1 as it is. When the lower limit of the first target acceleration at1 in travel on gentle curves is set to 0 as described above, the vehicle can be prevented from being controlled in acceleration on a gentle curve because the control of braking/driving force is executed with the lower limit of 0 G as the target acceleration on the gentle curve with which the follow-up target acceleration calculator 20 as the first calculating means calculates a smaller first target acceleration at1 and the second curve-travel target acceleration calculator 43 as the second calculating means calculates the second target acceleration at2 larger than the lower limit of 0 G.

Figure 4:
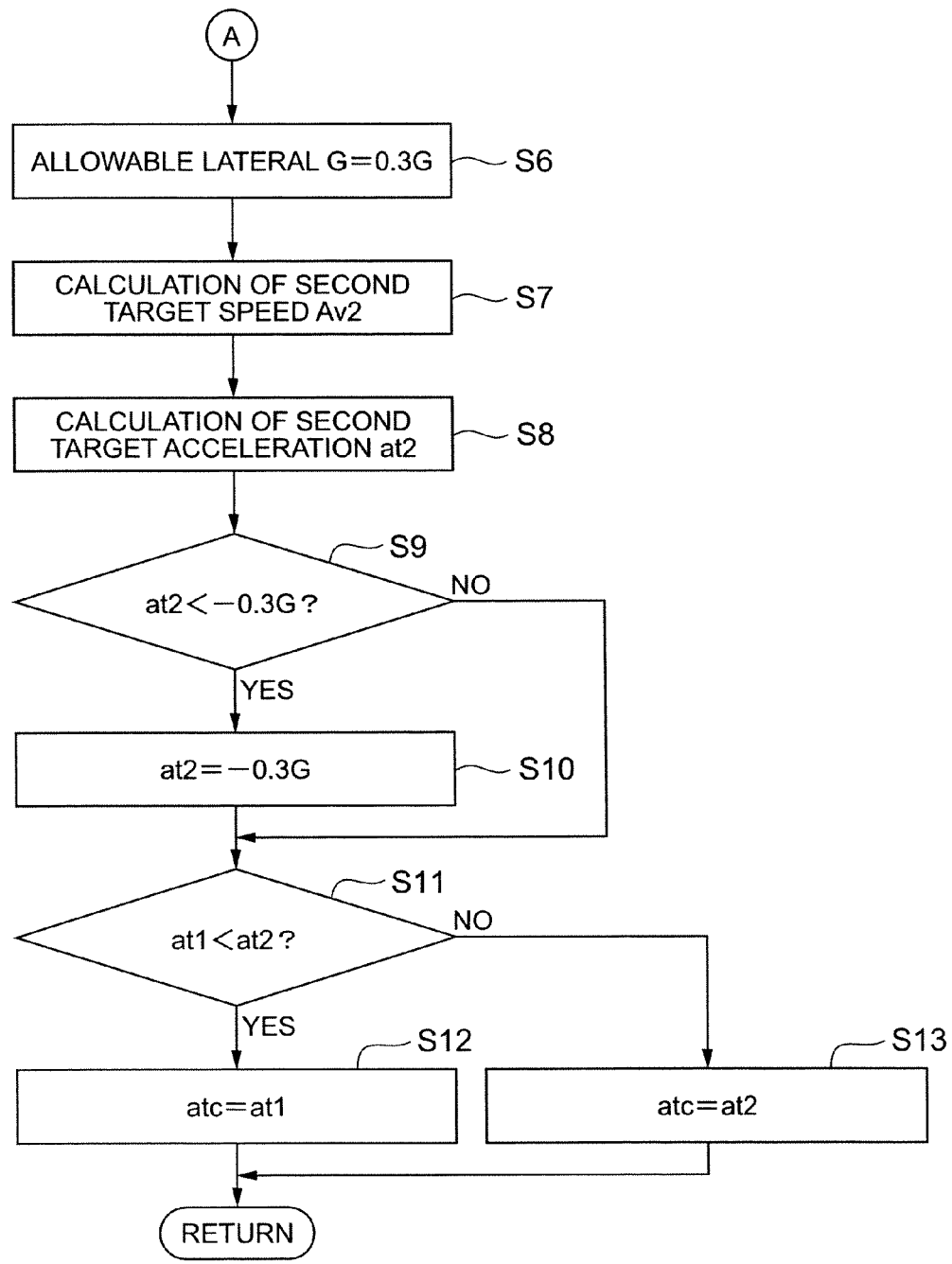
FIG. 4 is a flowchart showing a procedure subsequent to FIG. 3.

On the other hand, after the first target acceleration at1 is calculated with the gentle-curve allowable lateral acceleration G1 as the allowable lateral acceleration, the second curve-travel target acceleration calculator 43 then sets the allowable lateral acceleration to the sharp-curve allowable lateral acceleration G2 larger than the gentle-curve allowable lateral acceleration G1, as shown in FIG. 4 (S6). The sharp-curve allowable lateral acceleration G2 is set to 0.3 G. When the allowable lateral accelerations for travel on gentle curves and for travel on sharp curves are set as separate values in this manner, it is feasible to set accelerations according to the respective curves.

After the sharp-curve allowable lateral acceleration G2 is set in this manner, the second target speed Av2 is calculated based on the aforementioned Eq (5), in order to determine a vehicle speed for achievement of this sharp-curve allowable lateral acceleration G2, as the second target speed Av2 (S7). Furthermore, the second target acceleration at2 is calculated based on the foregoing Eq (6), in order to determine an acceleration for achievement of this second target speed Av2 (S8).

In respect to it, the predetermined lower limit (G=0) is set for the first target acceleration at1 in the present embodiment. For this reason, the vehicle can be prevented from being controlled in acceleration on a gentle curve because the control of braking/driving force is carried out with the lower limit of 0 G as the target acceleration on the gentle curve with which the follow-up target acceleration calculator 20 as the first calculating means calculates the first target acceleration at1 smaller than the lower limit of 0 G and the second curve-travel target acceleration calculator 43 as the second calculating means calculates the second target acceleration at2 larger than the lower limit of 0 G. Furthermore, when the vehicle comes to travel from a gentle curve to a sharp curve where the second target acceleration at2 is less than the lower limit of 0 G, deceleration control of the vehicle is carried out while the second target acceleration at2 calculated by the first curve-travel target acceleration calculator 42 as the third calculating means is selected, from a constant-speed state with the target acceleration of 0 G. Therefore, the deceleration can be effected with a smaller deceleration shock than in the case where the deceleration is suddenly imparted. Therefore, suddenly decelerated cases are reduced at the entrance of sharp curves, which prevents degradation of ride quality for occupants during travel on sharp curves.

After the second target acceleration at2 is calculated in this way, it is determined whether the second target acceleration at2 is less than −0.3 G (S9). When it is determined that the second target acceleration at2 is less than −0.3 G the second target acceleration at2 is set to −0.3 G (S10); when the second target acceleration at2 is not less than −0.3 G the calculated second target acceleration at2 is adopted as the second target acceleration at2 as it is.

After the first target acceleration at1 is calculated in step S6 and the second target acceleration at2 in step S11 as described above, it is determined whether the first target acceleration at1 is smaller than the second target acceleration at2 (S11). When it is determined that the first target acceleration at1 is smaller than the second target acceleration, the first target acceleration at1 is selected as the curve-travel target acceleration atc (S12). When the first target acceleration at1 is not less than the second target acceleration, the second target acceleration at2 is selected as the curve-travel target acceleration atc (S13).

If the lower limit is not set for the first target acceleration at1, the first target acceleration at1 will always be smaller than the second target acceleration at2. For this reason, the second target acceleration at2 will not be used and the same target acceleration as in travel on gentle curves will be set in travel on sharp curves, so as to effect large deceleration on the sharp curves, which can cause degradation of ride quality.

In contrast to it, the predetermined lower limit (=0 G) is set for the first target acceleration at1 in the present embodiment. For this reason, when the second target acceleration at2 is smaller than this lower limit, the second target acceleration at2 is smaller than the first target acceleration at1. In this case, the host vehicle can be decelerated at the acceleration determined in view of the ride quality during travel on sharp curves. Therefore, it can prevent degradation of ride quality for occupants during travel on sharp curves.

Figure 5:
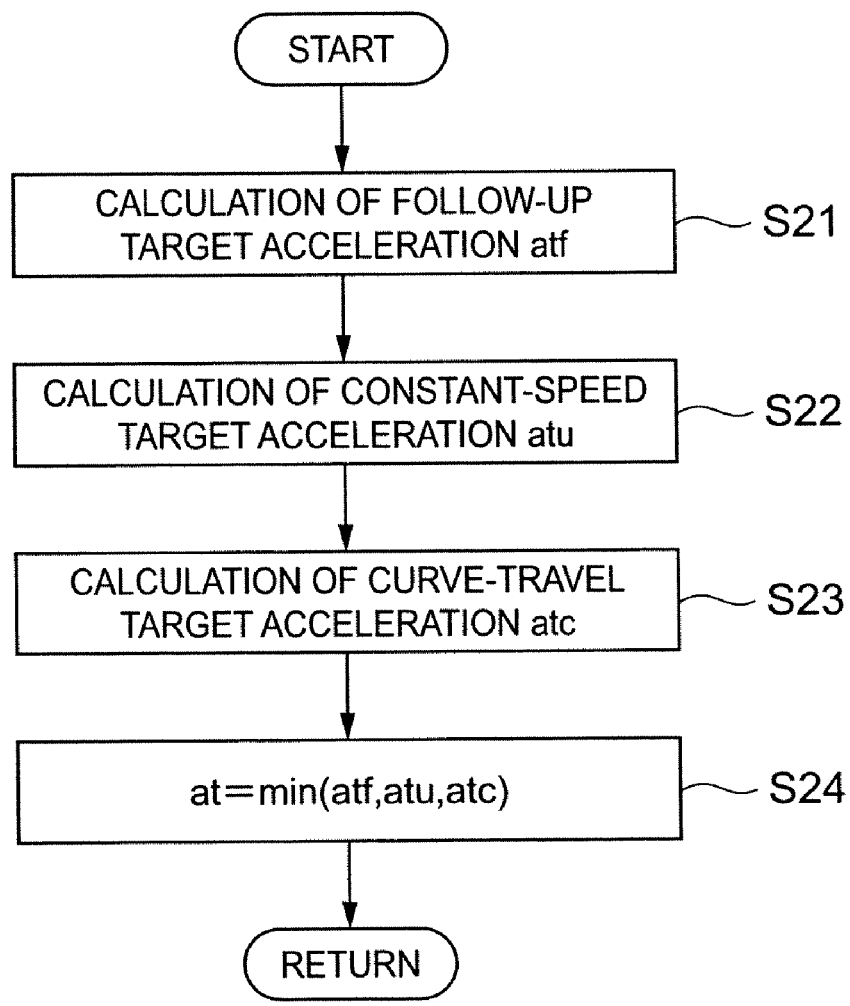
FIG. 5 is a flowchart showing a procedure of finally calculating a target acceleration.

Subsequently, the final calculation procedure of target acceleration will be described. FIG. 5 is a flowchart showing the procedure of finally calculating the target acceleration. As shown in FIG. 5, on the occasion of calculation of the target acceleration, the follow-up target acceleration calculator 20 first calculates the follow-up target acceleration atf (S21). The calculation of the follow-up target acceleration atf is carried out based on the aforementioned Eq (2). The follow-up target acceleration calculator 20 transmits the calculated follow-up target acceleration atf to the arbitrator 4. Next, the constant-speed target acceleration calculator 30 calculates the constant-speed target acceleration atu (S22). The constant-speed target acceleration calculator 30 transmits the calculated constant-speed target acceleration atu to the arbitrator 4.

Furthermore, the curve-travel target acceleration calculator 40 calculates the curve-travel target acceleration atc (S23). The calculation of the curve-travel target acceleration atc is carried out according to the procedure of the flowcharts shown in FIGS. 3 and 4. The curve-travel target acceleration calculator 40 transmits the calculated curve-travel target acceleration atc to the arbitrator 4. The arbitrator 4 compares the follow-up target acceleration atf, the constant-speed target acceleration atu, and the curve-travel target acceleration atc transmitted from the follow-up target acceleration calculator 20, from the constant-speed target acceleration calculator 30, and from the curve-travel target acceleration calculator 40, respectively, selects the minimum out of them, and sets the minimum as the target acceleration at (S24). The target acceleration is determined in this manner.

The following will describe an example of changes in target accelerations on the occasion of execution of the cruise control in the present embodiment. FIG. 6 is graphs showing temporal changes of target accelerations, wherein (a) shows temporal changes of the follow-up target acceleration atf, the first target acceleration at1, and the second target acceleration at2 and (b) a temporal change of target acceleration outputted from the arbitrator 4.

As shown in FIG. 6 (a), it is assumed that the follow-up target acceleration atf remains at an almost constant acceleration during travel of the host vehicle from a straight line to curves. At this time, in a straight-travel zone X1 the first target acceleration at1 and the second target acceleration at2 both indicate large values. When the vehicle moves from this state into a zone X2 where it travels on a gentle curve, the first target acceleration at1 reduces and becomes smaller than the follow-up target acceleration atf with time. The first target acceleration at1 remains at the value of 0 after the target acceleration becomes 0. Furthermore, in the zone X2 the second target acceleration at2 reduces with a lag from the first target acceleration at1 but always maintains a value larger than the first target acceleration at1.

When the vehicle then moves into a zone X3 where it travels on a sharp curve, the second target acceleration at2 becomes smaller than the value of 0 as the target acceleration. At this point, the second target acceleration at2 becomes smaller than the first target acceleration at1. Thereafter, the second target acceleration at2 starts increasing in the second half of the travel on the sharp curve. When the vehicle then enters a zone X4 where it travels on a gentle curve, the second target acceleration at2 exceeds 0 and becomes over the first target acceleration at1. Then the first target acceleration at1 also increases and the first target acceleration at1 becomes over the follow-up target acceleration atf. Thereafter, in a zone X5 where the vehicle travels on a straight line, the first target acceleration at1 and the second target acceleration at2 both become larger than the follow-up target acceleration atf.

Therefore, as the target acceleration finally calculated in the arbitrator 4, the follow-up target acceleration atf is always selected in the zones X1, X5 where the host vehicle travels on the straight line, as shown in FIG. 6 (b). In the zones X2, X4 where the vehicle travels on the gentle curve, the first target acceleration at1 is selected from the point of time when the first target acceleration at1 becomes smaller than the follow-up target acceleration atf. For this reason, the vehicle can be prevented from being decelerated more than necessary on the gentle curve. Furthermore, in the zone X3 where the vehicle travels on the sharp curve, the second target acceleration at2 is selected at the point of time when the second target acceleration at2 becomes smaller than the first target acceleration at1. For this reason, it becomes feasible to prevent failure in deceleration on the sharp curve and to prevent degradation of ride quality for occupants.

The preferred embodiment of the present invention was described above, but the present invention is by no means limited to the above embodiment. For example, the above embodiment was arranged so that the curve-travel target acceleration calculator 40 set the first target acceleration at1 for gentle curves and the second target acceleration at2 for sharp curves, but it is also possible to adopt a configuration wherein more target accelerations are set according to states of curves. The above embodiment was arranged to set the speed control amount from the calculated target acceleration, but it is also possible, for example, to adopt configurations wherein the target speed is directly calculated and wherein the target speed is set from a target driving force control amount.

Furthermore, the above embodiment used the target inter-vehicular distance as the target relative relation to the target object, but it is also possible to use a target inter-vehicular time or a target relative time. On the other hand, the above embodiment was arranged to use the preset and stored values for these relative target relation and curve tolerances, but it is also possible, fore example, to adopt a configuration wherein the driver sets them by a switch, a lever, or the like, or a configuration wherein they are automatically set from the driving characteristics, age, etc. of the driver.

The above embodiment adopted the lower limit of 0 G, but the lower limit may be any value other than 0 G: for example, it is also possible to adopt a configuration wherein a negative lower limit, e.g., −0.01 G is set to apply a deceleration, or a configuration wherein, conversely, a positive lower limit, e.g., 0.02 G is set. In the case of the configuration wherein more target accelerations are set according to states of curves, it is preferable to set a plurality of lower limits. Specifically, a lower limit corresponding to a gentle curve tolerance is set to a value larger than a lower limit corresponding to a sharper curve tolerance. This configuration permits the target acceleration to be calculated so as to become smaller in a stepwise fashion from the largest lower limit out of the set lower limits.

As described above, the present invention allows the host vehicle to travel safely on curves, irrespective of accelerating and decelerating states of the preceding vehicle, on the occasion of performing the cruise control while following the preceding vehicle.

INDUSTRIAL APPLICABILITY

The present invention relates to the vehicle cruise control apparatus and is applicable, particularly, to the vehicle cruise control apparatus for controlling the host vehicle to travel to follow the preceding vehicle.

The invention claimed is:

1. A vehicle cruise control apparatus, comprising:
   relative relation calculating means for calculating a relative relation between a target object detected by object detecting means, and a host vehicle;
   specification setting means for:
      setting a target relative relation,
      setting a first curve tolerance defining an allowable curve state, and
      setting a second curve tolerance defining a gentler allowable curve state than the first curve tolerance;
   first calculating means for calculating a first speed control amount on the basis of the relative relation and the target relative relation;
   second calculating means for calculating a second speed control amount on the basis of the first curve tolerance;
   third speed calculating means for:
      calculating a speed control value on the basis of the second curve tolerance,
      comparing the calculated speed control value to a predetermined minimum speed control value, and
      adopting the greater of the calculated speed control value and the predetermined minimum speed control value as a third speed control amount; and
   controlling means for controlling a braking/driving force of the vehicle on the basis of the least of the first speed control amount, the second speed control amount, and the third speed control amount.

2. The vehicle cruise control apparatus according to claim 1, wherein the minimum speed control value is 0.

* * * * *